(12) United States Patent
Li

(10) Patent No.: US 6,180,892 B1
(45) Date of Patent: Jan. 30, 2001

(54) MIXING SCALE

(75) Inventor: Da Ke Li, Acton, MA (US)

(73) Assignee: Setra Systems, Inc., Boxborough, MA (US)

( * ) Notice: Under 35 U.S.C. 154(b), the term of this patent shall be extended for 0 days.

(21) Appl. No.: 09/337,748

(22) Filed: Jun. 22, 1999

(51) Int. Cl.$^7$ .................................................. G01G 13/02
(52) U.S. Cl. ........................ 177/116; 177/178; 177/245; 222/160; 141/83; 141/247
(58) Field of Search ..................... 177/116, 173, 177/177, 178, 245; 222/160, 164, 166; 141/247, 83

(56) References Cited

U.S. PATENT DOCUMENTS

| | | | | |
|---|---|---|---|---|
| 1,033,420 | * | 1/1912 | Koch ..................................... | 177/177 |
| 1,502,443 | * | 7/1924 | Schaper ................................. | 177/178 |
| 2,343,621 | * | 3/1944 | Williams ............................... | 177/178 |
| 2,937,862 | * | 5/1960 | William ................................. | 177/178 |
| 3,878,907 | * | 4/1975 | Morick .................................. | 141/83 |
| 4,364,442 | * | 12/1982 | Flickinger ............................. | 177/177 |
| 4,534,365 | * | 8/1985 | Bonetta et al. ....................... | 177/177 |
| 4,585,148 | * | 4/1986 | Ito .......................................... | 141/83 |
| 4,656,600 | * | 4/1987 | Swann .................................. | 177/177 |
| 4,844,297 | * | 7/1989 | Smith ..................................... | 141/83 |
| 5,680,110 | * | 10/1997 | Whisson ............................... | 177/118 |
| 6,053,218 | * | 4/2000 | Boers ..................................... | 222/160 |

* cited by examiner

Primary Examiner—Randy W. Gibson
(74) Attorney, Agent, or Firm—McDermott, Will & Emery

(57) ABSTRACT

An improved mixing scale, such as a paint mixing scale, includes a base which supports a scale pan in a substantially horizontal position. The scale pan supports a receiver container for holding the contents of that which is to be weighed. The mixing scale also includes a backing member which extends upwardly from the base and includes an output display near a top end of the member for presenting the measurement values produced by the scale. Proximate to the output display is a visual flow monitoring device, such as a reflector. Placement of the reflector proximate to the output display allows a user of the mixing scale to monitor the measurement value presentation and the flow of an additive being delivered into the receiver container simultaneously, or at the very least without requiring a physical shift in position by the user which might otherwise disrupt the delivery operation. The visual flow monitoring device may be integral with the mixing scale or a stand alone component adapted to easily modify an existing mixing scale not configured with such a visual monitoring device.

20 Claims, 5 Drawing Sheets

MIXING SCALE

CROSS-REFERENCE TO RELATED APPLICATIONS

Not Applicable.

FIELD OF THE INVENTION

The invention relates generally to measuring devices. Specifically, the invention relates to measuring devices wherein measurement values are presented during the course of altering the composition of or adding to that which is being measured.

BACKGROUND OF THE INVENTION

Measuring devices are, of course, in wide use generally in a variety of environments. For example, measuring devices include scales which are used in such places as laboratories, hospitals, processing plants, and so on. In many instances, such measuring devices form part of a system for combining substances to achieve a predetermined mixture with a high degree of accuracy. When attempting such a mixture, the measuring device is used to ensure proper amounts of each substance, or additive, are combined. In other instances such devices are used for arriving at a predetermined amount of a single substance. To facilitate ease of reading the measurement values from such devices, digital displays are now commonly used as the output mechanism for the presentation of such values. Depending on the application, measuring devices may be operated by a human user or part of an automated system.

One instance where achieving predetermined mixtures with a very high degree of accuracy is required is with "mixing scales" used for measuring and, typically, combining paints. Such paint mixing scales may be used, for example, in auto body shops or paint and hardware stores that sell or distribute paint for any of a wide variety of applications (e.g., house paint or auto paint). Paint manufactures typically make a large selection of colors and types of paint available to consumers or other users. Therefore, it is increasingly impractical for a paint distributor or paint shop to keep on hand such a large selection of paints in inventory. This problem is further exacerbated if a shop carriers more than one manufacture's lines of paint. Accordingly, it is commonplace for a shop or store to carry a small subset of "base" paints, to which a mixture of primary colors, for example, can be added to form any of the colors from a manufacturer's line of colors.

Inaccuracies in the measuring equipment or measuring process cause the paint color to be off, which is often not evident until the paint is applied and then dried. Such inaccuracies can occur when a user is manually controlling the flow of fluid (e.g., paint) into a receiver container positioned on the mixing scale. In that case, the user can not closely view the flow of fluid and the display of measurement values at or near the same time, since they are not proximate to each other. As a result, the user may not adequately control the rate of flow of the fluid, if focusing on the display, which tends to lead to over filling and/or improper paint mixtures. On the other hand, if the user focuses on the flow of fluid, it is extremely difficult to measure out the proper amount, again leading to improper mixtures. When a paint is improperly mixed, not only is paint wasted, but a significant amount of the painter's time is lost, as well as the possible loss of goodwill and reputation of the shop or store that mixed the paint. Even when not mixing paint, it may be desirable or advantageous to accurately measure out a predetermined amount of a single paint.

Accordingly, it is an object of the present invention to provide a mixing scale with improved accuracy and ease of use in the measurement and/or mixing of substances. Other objects and advantages of the present invention will be evident from the description and accompanying drawings herein.

SUMMARY OF THE INVENTION

The present invention is an improved mixing scale used, for example, in the measuring and/or mixing of paints. The improved mixing scale includes a base which supports a scale pan in a substantially horizontal orientation. A receiver container for the item to be weighed or measured is placed on the scale pan. Extending from the base in a generally vertical orientation is a backing member which includes a user interface panel proximate to the top of the backing member, or at least above the height of a typical receiver container. Among other things, the user interface panel includes operator controls and an output display. Preferably the output display is a digital display which displays the value of the measurement taken by the mixing scale. Proximate to the output display is a visual flow monitoring device (e.g., a reflector), which allows a user of the mixing scale to simultaneously, or nearly simultaneously, view the output display and reflector. To accommodate users of different heights, the reflector is rotatable with respect to a vertical axis. In some embodiments, the output display and reflector may also be moved vertically and in combination to accommodate receiver containers of different heights. Benefits may also be realized from enabling the reflector and/or display to move horizontally.

In practice, a receiver container is positioned on the scale pan and the scale is calibrated to a zero measurement position to ensure that only the contents of the receiver container are measured, and not the receiver container itself. In most instances, an additive (e.g., a paint or a paint tint) is poured from an additive container into the receiver container by the user, as the user monitors the output display and the flow of the additive into the receiver container using the reflector. In other instances, the additive may be delivered from an additive container by means other than pouring, but where monitoring of the flow of the additive is still necessary. The proximity of the reflector to the display make it relatively easy to view both simultaneously or nearly simultaneously. Additionally, the orientation of the reflector proximate to the output display ensures that a user will not have to physically adjust his or her position to view one or the other. Such physical movement could cause a disruption of the flow of fluid and resulting errors in mixing or measuring out a predetermined quantity of the fluid.

BRIEF DESCRIPTION OF THE DRAWINGS

The foregoing and other objects of this invention, the various features thereof, as well as the invention itself, may be more fully understood from the following description, when read together with the accompanying drawings, described as follows.

For the most part, and as will be apparent when referring to the figures, when an item is used unchanged in more than one figure, it is identified by the same alphanumeric reference indicator in all figures.

DETAILED DESCRIPTION OF THE PREFERRED EMBODIMENTS

The present invention is an improved mixing scale, which allows a user of the scale to visually monitor the flow of additives into a receiving container positioned on the mixing scale, while simultaneously, or nearly simultaneously, monitoring the presentation of a measurement value produced by the mixing scale. Monitoring the flow of additives is particularly useful when adding only small amounts of an additive, for example, when adding one drop at a time. In the preferred embodiment, the improved mixing scale is a paint mixing scale, typically operated by a single user. With such a scale, it is useful for the user to monitor the measurement values output by the scale while pouring an additive (e.g., a paint of a different color or a paint tint) into a paint can, as a receiver container, positioned on the scale. The paint can may initially contain paint of a "base" color which is to be tinted to create a paint of a different color or shade. In other instances, the user may only be concerned with measuring out a predetermined amount of a single paint.

Figure 1:
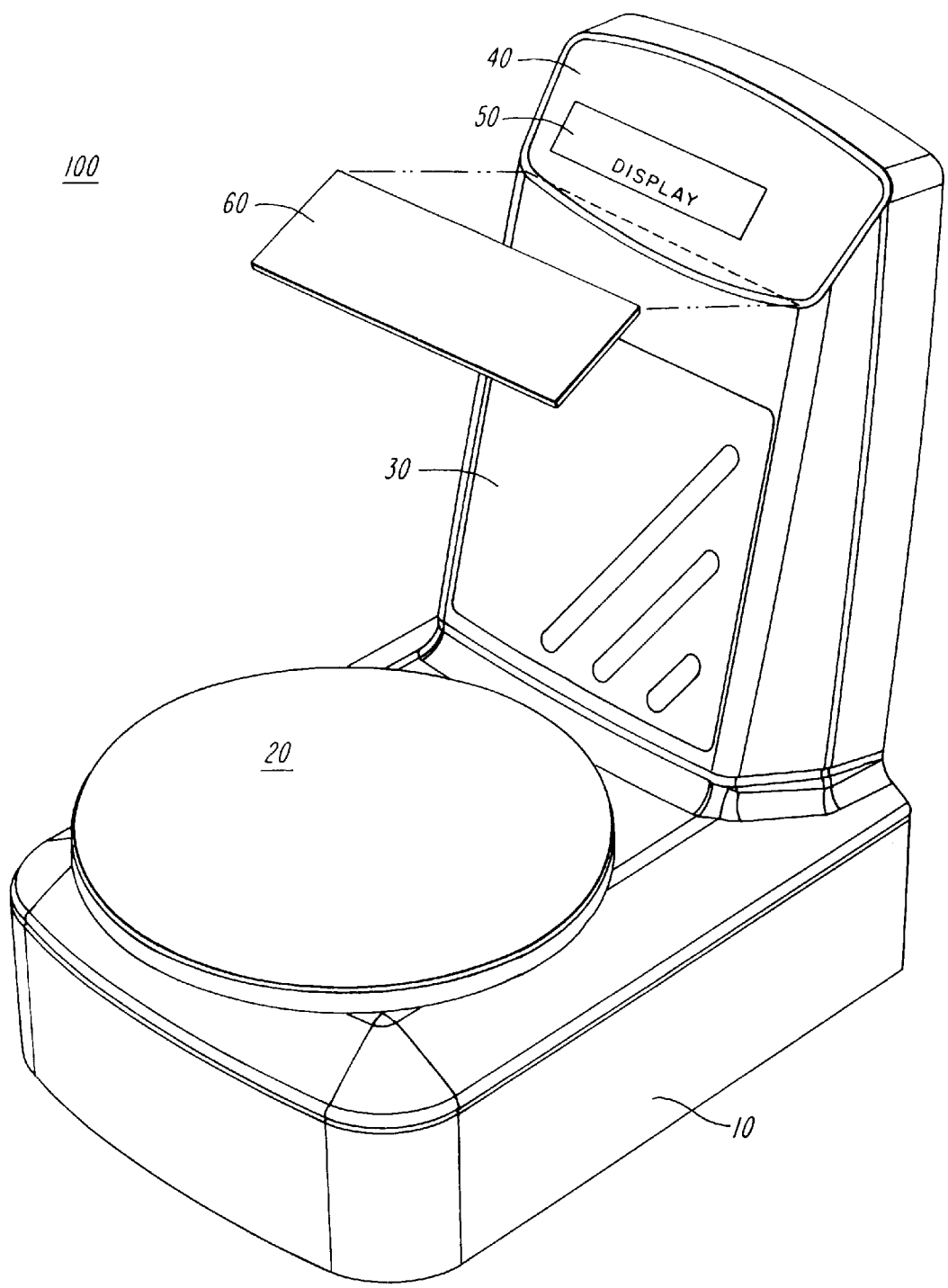
FIG. 1 is a perspective view of an improved mixing scale in accordance with the present invention, but wherein its reflector unattached.

FIG. 1 shows a partially exploded view of a typical prior art paint mixing scale, such as the FP7000 Digital Scale by Fillon Pichon of Rhode Island, adapted with a device for visually monitoring the flow of fluid additives to a receiver container positioned on the scale. The paint mixing scale may provide measurements in units of parts or grams, although other units are also possible. A base 10 serves as the foundation of the mixing scale, and is formed to support the mixing scale in a stable horizontal orientation on a flat horizontal surface, such as a top surface of a workbench. In such an orientation, a scale pan 20 is maintained in an orientation substantially parallel to the workbench surface upon which base 10 rests. While scale pan 20 is shown to be disk shaped, it actually may be any of a number of shapes, so long as it includes a surface contoured for supporting that which is to be weighed or its container. A backing member 30 extends generally vertically from base 10, and is, thus, oriented to be generally vertical with respect to horizontal scale pan 20. Backing member 30 need not be purely vertical, but may be angled. A user interface panel 40, including controls and displays, is integral with a top portion of backing member 30, which is distal to base 10. Among other things, the controls and displays of user interface panel 40 include an on/off control (not shown), a calibration control (not shown), and an output display 50 which displays, for example, the weight of an item positioned on scale pan 20. In the preferred embodiment, output display 50 is a digital, light emitting diode (LED) display and the on/off and calibration controls are typical scale features known in the art.

Figure 2:
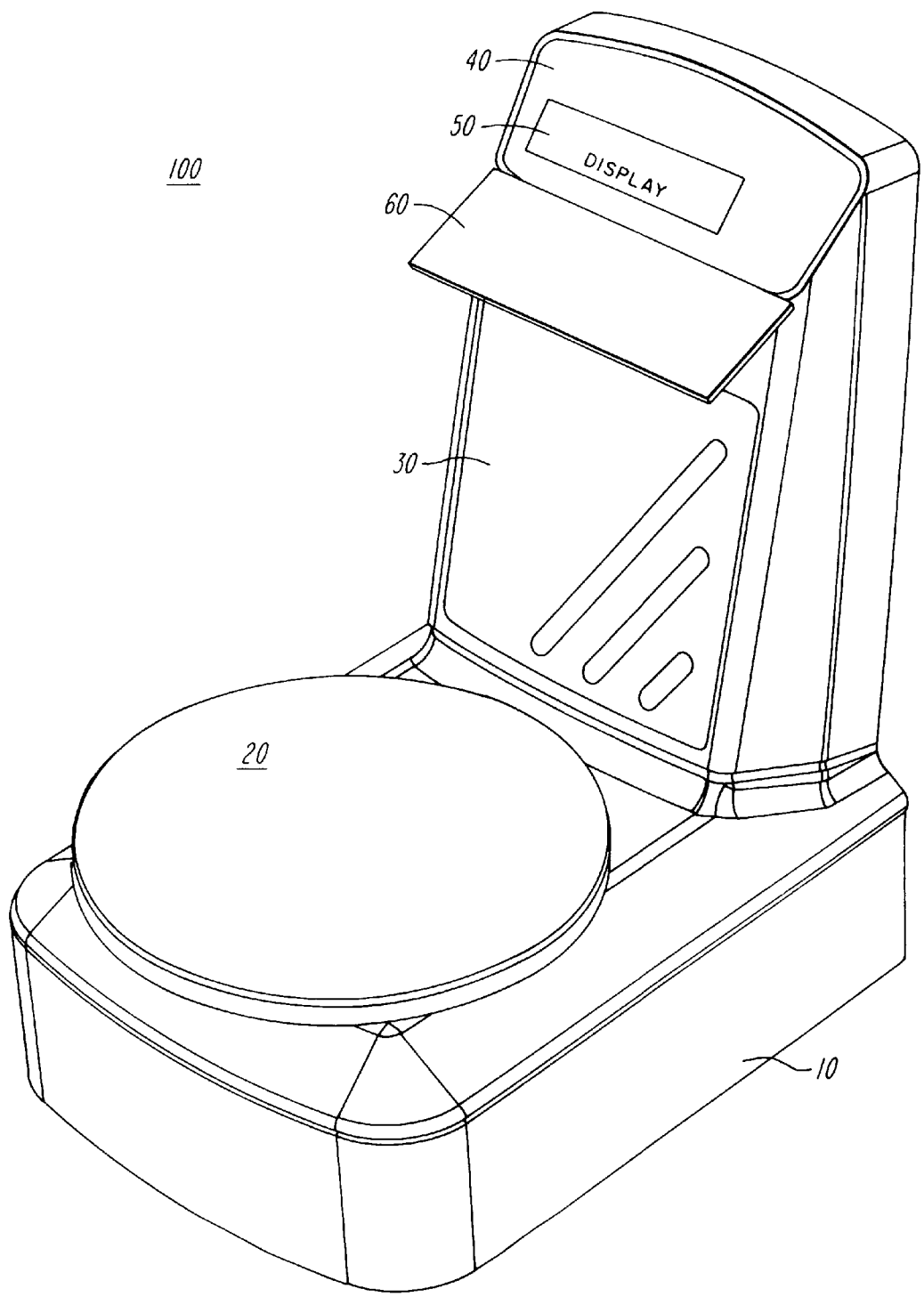
FIG. 2 is a perspective view of the improved mixing scale of FIG. 1 with the reflector attached.

The fluid monitoring device of the preferred embodiment is in the form of a reflector 60, shown unattached in FIG. 1 and attached to backing member 30 in FIG. 2. Preferably, reflector 60 is a glass mirror, but reflectors made from other materials could also be used, such as a reflector made from a highly polished metal. A highly polished metal reflector provides the benefit of greater durability than the glass mirror and may be preferred to glass in many instances. In either case, it is beneficial that the reflector be formed from a material which is not only highly reflective, but also capable of being easily cleaned, given the possibility of getting paint or other substances on the mirror from time to time. As will be appreciated by those skilled in the art, the mixing scale includes various known means, including mechanical devices and electronics (not shown), for measuring the weight of an item on scale pan 20, processing user control inputs, and outputting measurement values to display 50. For the most part, such known means are not discussed in detail herein.

Reflector 60 is positioned to be proximate to display 50 to allow a user of mixer scale 100 to simultaneously view the output of display 50 and the reflection of reflector 60 of an additive being delivered into a receiver container on scale pan 20. At the very least, placement of reflector 60 near display 50 allows a user to quickly alternate between viewing the display and the reflector without significantly moving his or her body, but rather need only slightly move his or her eyes, at most. This allows for virtually uninterrupted monitored delivery of an additive into the receiver container. Additionally, the angular orientation of reflector 60 is preferably similar to that of user interface panel 40 and display 50, which further enhances the ease of use of mixer scale 100.

Figure 3:
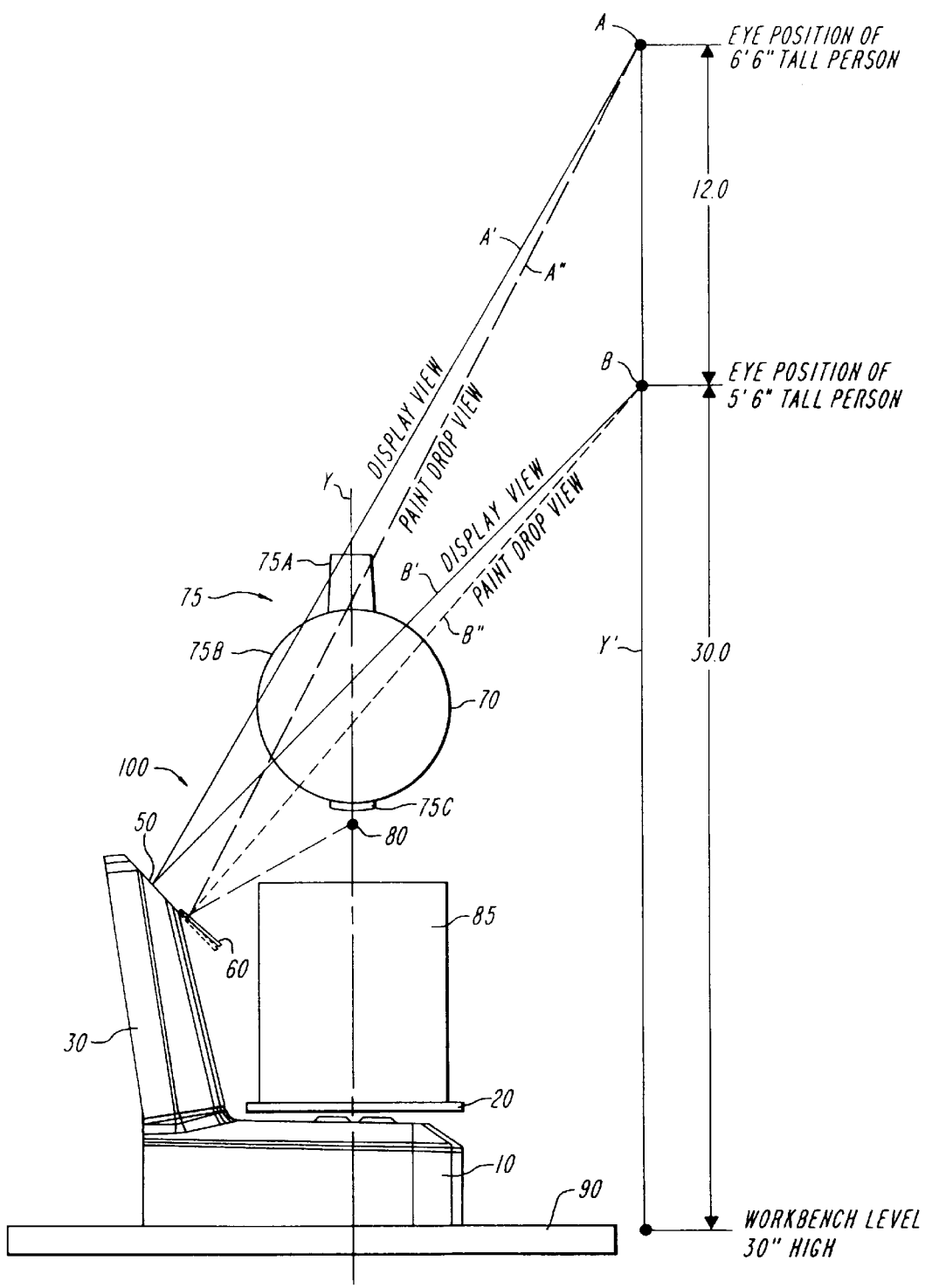
FIG. 3 is a diagrammatic side view of the improved mixing scale of FIG. 2, demonstrating the relative positions of the improved mixing scale, an additive container, and a mixing scale user, according to one embodiment of the present invention.

FIG. 3 shows a side view of paint mixing scale 100 with a receiver container 85 (e.g., paint can) positioned on scale pan 20. Base 10 supports mixing scale 100 on a top surface of workbench 90 and also supports scale pan 20 in a substantially horizontal plane, preferably parallel to the top surface of workbench 90. Reference axis Y is orthogonal to the plan, which includes scale pan 20 and passes substantially vertically through the horizontal center of cylindrical receiver container 85 and disk shaped scale pan 20. An additive container 70 is shown in the process of pouring an additive 80 in to receiving container 85 along reference axis Y. Additive container includes a commonly used pouring lid 75. Pouring lid 75 includes a handle 75A and a spout 75C which are each integral with a cover 75B, and oriented opposite each other about the circumference of cover 75B. Cover 75B secures to additive container 70 such that additive container 70 may be lifted by handle 75A to pour an additive from spout 75C along reference axis Y. As will be appreciated by those skilled in the art, more accurate pouring control is achieved when additive container is proximate to the top opening of the receiver container, as shown in FIG. 3, because the flow of fluid can be more quickly terminated over shorter distances.

Figure 4:
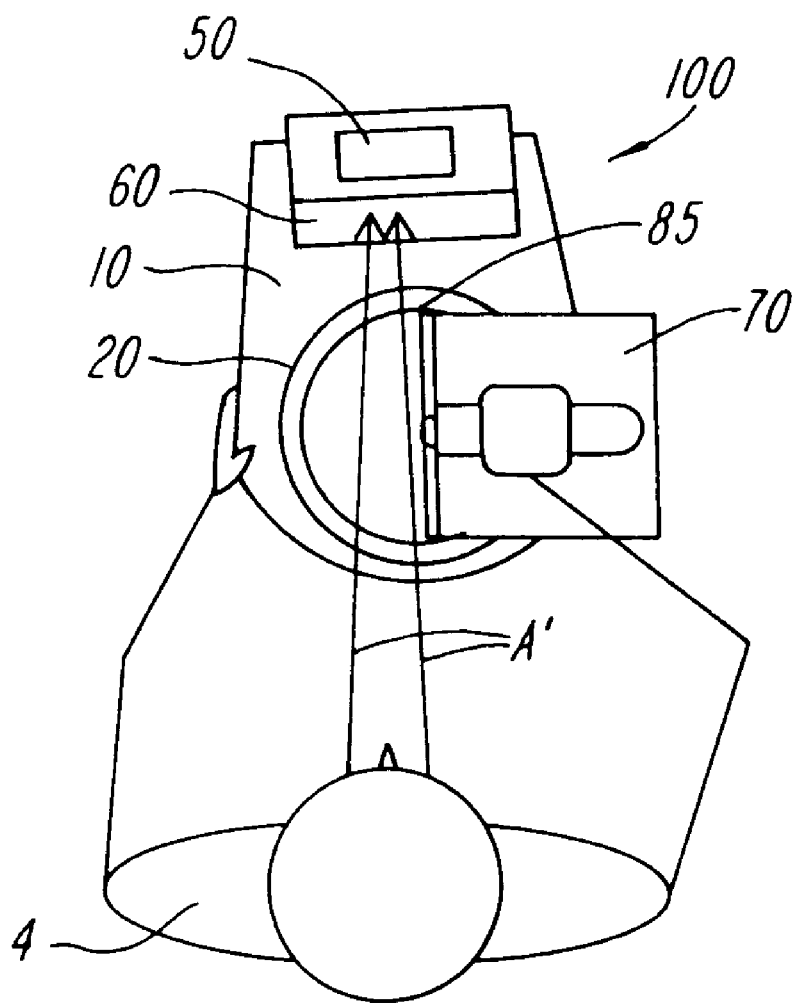
FIG. 4 is a diagrammatic top view of a user operating the mixing scale of FIG. 3.

FIG. 3 illustrates how paint mixing scale 100 is adaptable to facilitate the simultaneous viewing of display 50 and reflector 60 by users of different height. While engaged in the pouring of an additive from additive container 70 into receiver container 85, a user of about 6 feet, 6 inches tall can view both display 50 and reflector 60 when reflector 60 is in a first position (illustrated by the solid line representation of reflector 60). For instance, with a first user's eye at point A along user axis Y', which is parallel to reference axis Y, the first user's line of sight to the display is given by line A' and the user's line of sight to the reflector is given by broken line A". At the relatively short distance from mixing scale 100 of the user and the close proximately and similar angular orientation of display 50 and reflector 60, the divergence of lines A' and A" is small enough at the display and reflector such that both may be practically viewed simultaneously. FIG. 4 shows a top view of the arrangement of FIG. 3 and illustrates how a user U may look past the additive container 70 to gain a clear line of sight to display 50 and reflector 60.

In the preferred embodiment, and as can be appreciated from FIG. 3, reflector 60 is rotatably mounted to backing member 30. The rotatable mounting allows the reflector angle to be adjusted for users of different heights. For example, a second user of height 5 feet 6 inches tall has a line of sight originating from point B along user axis Y'. To accommodate the second user viewing from point B, reflector 60 may be rotated to a second position (indicated by the broken line representation of reflector 60). In the second position, the second user has a line of sight to display 50 given by line B' and a line of sight to the reflector 60 is given by line B". Accordingly, like the first user, the second user can practically view the display and the reflector simultaneously.

Figure 2A:
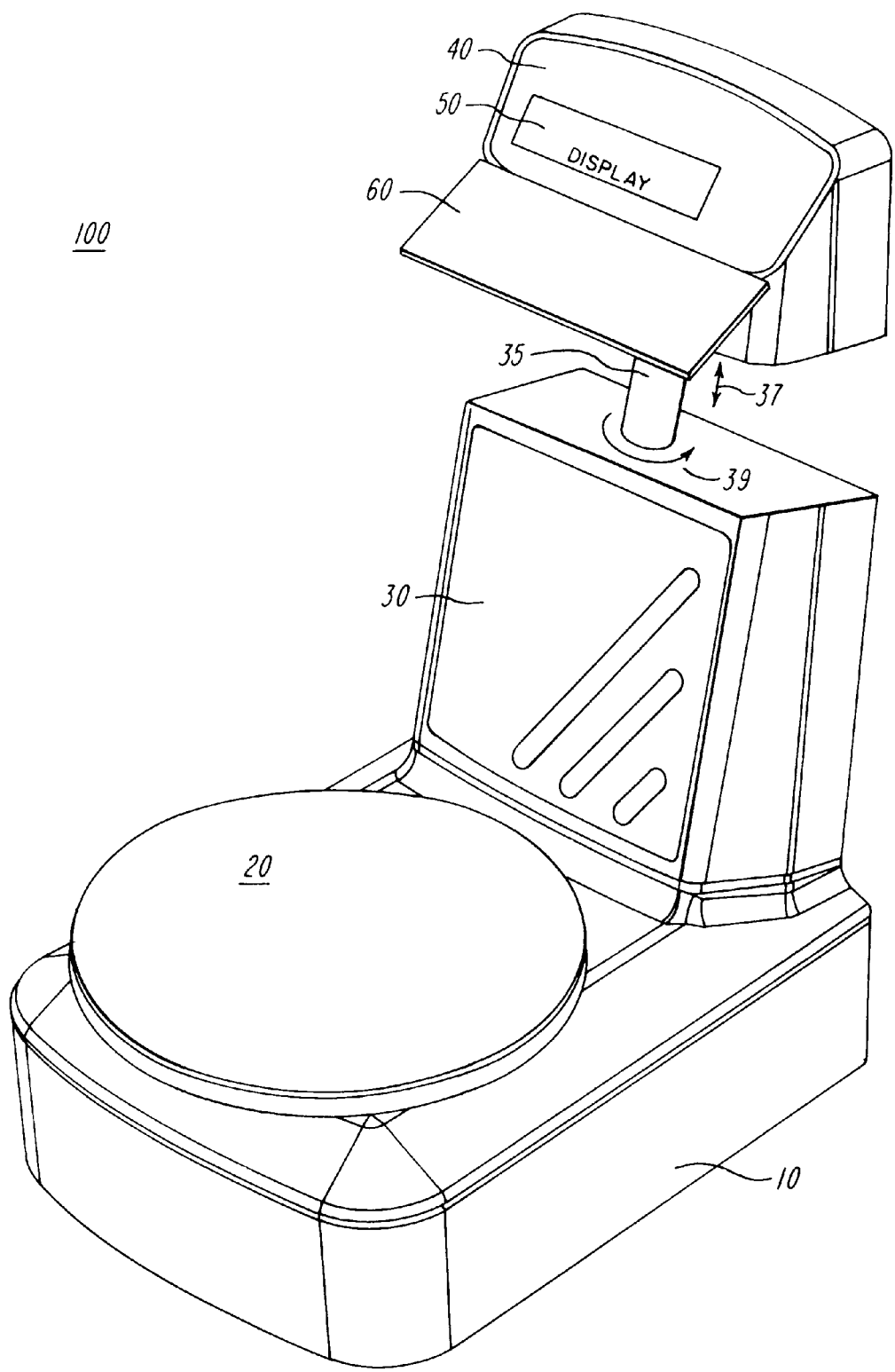
FIG. 2A is a perspective view of the improved mixing scale with a adjustment means.

While reflector 60 is shown as being integral with backing member 30, reflector 60 may also be in a stand alone form and adapted for securing to an existing mixing scale not having such a reflector. In that case, the stand alone reflector, or other view monitor, may include, as an example, one or more adapters having adhesive portions for attaching said reflector to an existing mixing scale. Additionally, while the invention is shown has having reflector 60 rotatably secured to backing member 30 in a fixed vertical position and having output display 50 integral with backing member 30 so as to be secured in a fixed vertical position, this need not be the case. That is, the combination of reflector 60 and display 50 may be movable in the vertical direction, as is shown in FIG. 2A (see arrow 37). In such a case, the combination may be slidably attached to one or more vertical members 35 coupled to or integral with backing member 30 or extending upwardly from base 10. Such a system allows the mixing scale to be adapted for receiver containers of different heights. For example, in the case of a paint mixer scale, the display and reflector combination may be vertically repositioned when switching from a receiver container which is a gallon size paint can to a receiver container which is a quart size paint can. In certain situations it may also be advantageous to enable reflector 60 and display 50 to have freedom of movement in a horizontal direction, (see arrow 39) for instance to offset from center the combination with respect to a receiver. This may be particularly useful to accommodate different left and right handed users.

The invention may also be embodied in other specific forms without departing from the spirit or central characteristics thereof. For example, if a mixing scale has an audio output for presenting measurement values to the user, reflector 60 need not be positioned proximate to a digital output display. Additionally, while the present invention is described in terms of an embodiment which relates to paint mixing scales, it should be appreciated that the present invention also relates to scales used for other purposes, including scales used for measuring dry goods, such as spices, dry chemicals, powders, and so on. The present embodiments are therefore to be considered in all respects as illustrative and not restrictive, the scope of the invention being indicated by appending claims rather than by the foregoing description, and all changes that come within the meaning and range of equivalency of the claims are therefore intended to be embraced therein.

What is claimed is:

1. An improved mixing scale in operative communication with a container to measure the weight of the contents of the container, said mixing scale comprising:

A) a measuring means for determining a weight measurement value of said contents of the container;

B) a housing means for providing structural support to said measuring means;

C) a measurement output means for presenting to a user said measurement value; and D) a flow monitoring means for visually monitoring the flow of an additive into the container, wherein said flow monitoring means is viewable by said user while the user simultaneously receives said measurement output means presentation of said measurement value.

2. The improved mixing scale of claim 1, wherein said flow monitoring means is a reflector.

3. The improved mixing scale of claim 2, wherein said reflector includes a glass mirror.

4. The improved mixing scale of claim 2, wherein said reflector includes a polished metal surface.

5. The improved mixing scale of claim 1, wherein said flow monitoring means includes rotation means for rotating said flow monitoring means with respect to said housing means.

6. The improved mixing scale of claim 1, wherein said measuring means includes a substantially horizontal container support means for maintaining said container means in a substantially vertical position and wherein said flow monitoring means and said measurement output means are adjustable with respect to said container support means.

7. The improved mixing scale of claim 6, wherein said flow monitoring means and said measurement output means are adjustable in a substantially vertical direction with respect to said container support means.

8. The improved mixing scale of claim 1, wherein:

said measuring means includes a container support means for supporting said container in operative communication with said measuring means;

said measurement output means is a digital display means;

said flow monitoring means is a reflector means; and said housing means includes:

i) a base means for supporting said container support means; and ii) a backing member means, extending generally vertically from said base means, for supporting said digital display means and said reflector means in close proximity to each other.

9. An improved mixing scale system in operative communication with a container to measure the weight of the contents of the container, said mixing scale comprising:

A) a scale;

B) a housing, encasing at least a portion of said scale;

C) a measurement output mechanism, adapted to present a measurement value detected by said scale; and D) a flow monitor, oriented to enable visual monitoring of the flow of an additive into the container, wherein said monitor is viewable by said user while the user simultaneously receives said measurement presentation of said measurement value.

10. The improved mixing scale system of claim 9, wherein said monitor is a reflector.

11. The improved mixing scale system of claim 10, wherein said reflector includes a glass mirror.

12. The improved mixing scale system of claim 10, wherein said reflector includes a polished metal surface.

13. The improved mixing scale system of claim 9, wherein said monitor is rotatable with respect to said housing.

14. The improved mixing scale system of claim 9, wherein said scale includes a substantially horizontal scale pan, which maintains said container in a substantially vertical position and wherein said monitor and said measurement output mechanism are movable with respect to said scale pan.

15. The improved mixing scale system of claim 14, wherein said monitor and said measurement output mechanism are adapted to be adjustable in a substantially vertical direction with respect to said base plate.

16. The improved mixing scale system of claim 9, wherein:

said scale includes a base plate for supporting said container in operative communication with said scale;

said measurement output mechanism is a digital display;

said flow monitor is a reflector; and said housing includes:

i) a base, adapted to support said base plate; and ii) a backing member, extending generally vertically from said base and supporting said digital display and said reflector in close proximity to each other.

17. A fluid flow monitor for use with a mixing scale, wherein said mixing scale includes a weight measurement mechanism in operative communication with a digital display for displaying the weight of the contents of a container being measured by said weight measurement mechanism, said fluid flow monitor comprising:

a reflector disposed in close proximity to said digital display; and a mixing scale adapter to allow said reflector to be coupled to said mixing scale.

18. The fluid flow monitor of claim 17, wherein said reflector includes a glass mirror.

19. The fluid flow monitor of claim 17, wherein said reflector includes a polished metal surface.

20. The fluid flow monitor of claim 17, wherein said reflector is rotatable with respect to said mixing scale.

\* \* \* \* \*